United States Patent
Hyotylainen et al.

(10) Patent No.: US 9,641,624 B2
(45) Date of Patent: May 2, 2017

(54) SERVICE PROVISIONING IN A COMMUNICATIONS SYSTEM

(75) Inventors: Tahvo Hyotylainen, Tampere (FI); Minna Myllymaki, Tampere (FI); Anu Leinonen, Tampere (FI); Kalle Tammi, Nokia (FI); Timo Virtanen, Rome (IT); Martti Ylikoski, Helsinki (FI); Arja Tusa, Pirkkala (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 2543 days.

(21) Appl. No.: 11/201,113

(22) Filed: Aug. 11, 2005

(65) Prior Publication Data

US 2006/0268835 A1    Nov. 30, 2006

(30) Foreign Application Priority Data

May 10, 2005    (FI) ........................................ 20050494

(51) Int. Cl.
G06F 15/173    (2006.01)
H04L 29/08    (2006.01)
(Continued)

(52) U.S. Cl.
CPC ........ H04L 67/14 (2013.01); H04L 29/12188 (2013.01); H04L 61/1588 (2013.01);
(Continued)

(58) Field of Classification Search
CPC ........... H04L 65/1016; H04L 29/12188; H04L 61/1588; H04L 67/306; H04L 65/1006;
(Continued)

(56) References Cited

U.S. PATENT DOCUMENTS 7,165,122 B1 *    1/2007    Sitaraman ........... H04L 61/2061
                                                                    709/213
2002/0160810 A1 *   10/2002    Glitho et al. ................. 455/560
(Continued)

FOREIGN PATENT DOCUMENTS

EP    1 517 566    3/2005
JP    2005-094774    4/2005
(Continued)

OTHER PUBLICATIONS

"Digital Cellular Telecommunications System (Phase 2+); Universal Mobile Telecommunications System (UMTS); IP Multimedia (IM) Subsystem Cx and Dx Interfaces; Signalling Flows and Message Contents (3GPP TS 129.228 Version 6.5.0 Release 6)", ETSI, Dec. 2004, pp. 1-55.

(Continued)

Primary Examiner — Oleg Survillo
(74) Attorney, Agent, or Firm — Squire Patton Boggs (US) LLP

(57) ABSTRACT

A service provisioning mediator entity in a communications system is provided with information defining a set of service provisioning triggering messages. In response to receiving a service provisioning triggering message including an identifier associated with a user from a further network entity involved in providing the service to the user, the service provisioning mediator entity triggers service provisioning in the communications system for the user. The service provisioning triggering message may be sent by a controlling network entity upon receiving from an information store a message indicating that a user attempting to register is not recognized. If the user is recognized, trigger information in the information store may be used for directed a session to a network entity configured to handle service provisioning triggering messages. As a further alternative, a user may (Continued)

request service provisioning by sending a service provisioning triggering message from a communication device.

36 Claims, 10 Drawing Sheets

(51) Int. Cl.
- *H04W 8/04* (2009.01)
- *H04W 60/04* (2009.01)
- *H04W 8/18* (2009.01)
- *H04L 29/12* (2006.01)
- *H04L 29/06* (2006.01)
- *H04W 8/12* (2009.01)

(52) U.S. Cl.
CPC ............. *H04L 67/306* (2013.01); *H04W 8/04* (2013.01); *H04W 8/18* (2013.01); *H04W 60/04* (2013.01); *H04L 65/1006* (2013.01); *H04L 65/1016* (2013.01); *H04W 8/12* (2013.01)

(58) Field of Classification Search
CPC .......... H04L 67/14; H04W 8/12; H04W 8/18; H04W 60/04; H04W 8/04
USPC ................................ 709/225–226, 228–229
See application file for complete search history.

(56) References Cited

U.S. PATENT DOCUMENTS

| | | | | |
|---|---|---|---|---|
| 2005/0009520 | A1* | 1/2005 | Herrero et al. | 455/435.1 |
| 2005/0020259 | A1* | 1/2005 | Herrero | 455/433 |
| 2006/0047822 | A1* | 3/2006 | Willis | H04L 67/14 709/228 |
| 2006/0068762 | A1* | 3/2006 | Baldwin et al. | 455/412.1 |
| 2006/0136557 | A1* | 6/2006 | Schaedler | H04L 29/06 709/203 |
| 2006/0140385 | A1* | 6/2006 | Haase | H04L 29/06 379/221.09 |
| 2006/0276226 | A1* | 12/2006 | Jiang | H04W 8/183 455/558 |

FOREIGN PATENT DOCUMENTS

| | | | |
|---|---|---|---|
| WO | WO 96/38018 | A1 | 11/1996 |
| WO | 9937103 | A1 | 7/1999 |
| WO | WO02/091786 | A1 * | 11/2002 |
| WO | WO 02/091786 | A1 | 11/2002 |

OTHER PUBLICATIONS

Nokia Corporation RFC 3261 (Request for Comments), Jun. 2002, pp. 1-252.
3GPP TS 24.229, V5.6.0 (Sep. 2003), 2003, pp. 1-257.
European Office Action dated Oct. 2, 2009, 5 pgs.
ETSI TS 129 228, V6.5.0 (Dec. 2004), Technical Specification, Digital Cellular Telecommunications System (Phase 2+); Universal Mobile Telecommunications System (UMTS); IP Multimedia (IM) Subsystem Cx and Dx Interfaces; Signalling Flows and Message Contents (3GPP TS 29.228 Version 6.5.0 Release 6); ETSI 3rd Generation Partnership Project (3GPP), Dec. 2004, pp. Title Page, 1-55, France.
PCT International Search Report, International Application No. PCT/IB2006/001307, Date of Completion: Dec. 18, 2006, Date of Mailing: Dec. 29, 2006, pp. 1-6.
PCT International Preliminary Report on Patentability, International Application No. PCT/IB2006/001307, Date of Issuance of Report: Jul. 27, 2010, Date of Mailing: Aug. 5, 2010, pp. 1-14.
Japanese Office Action issued in corresponding Japanese Patent Application No. 2008-510668.
European Office Action dated Feb. 10, 2011 in corresponding European Application No. 06744727.6.
-D3 "Clarification on SPI related text", 3GPP Draft; N1-021122-23.218-spi-3, 7 May 13-17, 2002, Budapest, Hungary, 12 pages.
- D4: "CRs on asserted identity", 3GPP Draft; NP-020312, Jun. 5-7, 2012, Marco Island, USA, 12 pages.

* cited by examiner

SERVICE PROVISIONING IN A COMMUNICATIONS SYSTEM

BACKGROUND OF THE INVENTION

Field of the Invention

The present invention relates in general to service provisioning in communications systems. The invention relates in particular, but is not restricted, to auto provisioning of services.

Related Art

A communication system can be seen as a facility that enables communication sessions between two or more entities such as user equipment and/or other nodes associated with the communication system. The communication may comprise, for example, communication of voice, data, multimedia and so on. Communication systems providing wireless communication for communications devices, including various user equipment, are known. An example of the wireless systems is the public land mobile network (PLMN). Another example is the wireless local area network (WLAN).

A PLMN is typically a cellular system wherein a base transceiver station (BTS) or similar access entity serves user equipment (UE) such as mobile stations (MS) via a wireless interface between these entities. The operation of the apparatus required for the communication can be controlled by one or several control entities. The various control entities may be interconnected. One or more gateway nodes may also be provided for connecting the cellular network to other networks, such as to another cellular system or to a public switched telephone network (PSTN) and/or other communication networks such as an IP (Internet Protocol) and/or other packet switched data networks.

A cellular network can thus provide access to various services and applications provided by the cellular network or by entities or networks external to the cellular network. The same is true also for other wireless networks connected to further networks. There are proposals for architectures for providing services in an access-network independent manner. As an example, this means providing conference call facilities, can be used by any communications device having certain defined capabilities and accessing the conference call facilities via any access network.

One proposal for providing services independently of the specific access network used by a communications device is the IP Multimedia Subsystem (IMS), defined in the 3rd Generation partnership project 3GPP specifications. The IMS services can be accessed via any access network providing IP connectivity. The General Packet Radio Service (GRPS) relating to the Global System for Mobile Communications (GSM) and the Universal Mobile Telecommunications System (UMTS) are two examples of an IP Connectivity Access Network (ICAN) for IMS.

The IMS, as any communication system, defines various entities for controlling service subscriptions and for providing services to users. In the IMS, these entities are implemented as servers in a network. In order to be able to request for a service from a communication system a user typically needs to have a subscription to the service and needs to be registered in the system in a serving control entity. In the IMS, information about the subscribers (subscribers' profiles) is stored in a home subscriber server (HSS) and the serving control entity is a Serving Call Service Control Function (S-CSCF) entity. A user may register to the serving control entity via an access entity of the communication system. As mentioned above, the IMS is access network independent, so it is sufficient that the access network provides IP connectivity.

In addition to the serving control entity, the user may need to be associated with a proxy control entity. In the IMS, the proxy control entity is the P-CSCF. The proxy entity is assigned to an area within which the user has roamed. For a more general case, when a user accesses the network through an arbitrary type of access network it can be assumed that the access network assigns a proxy control entity for controlling the accessed services from that network point of view, e.g. for bandwidth management.

In the IMS, a call state control function (CSCF) entity may provide functions such as serving call state control (S-CSCF), proxy call state control (P-CSCF), and interrogating call state control (I-CSCF). Control functions may also be provided by entities such as a home subscriber server (HSS) and various application servers.

The communication between the user equipment (communications device) and elements of a communication network is typically based on an appropriate communication protocol or on a set of appropriate communication protocols. A communication system furthermore typically operates in accordance with a given standard or specification which sets out what the various elements of the system are permitted to do and how that should be achieved. Communication protocols and/or parameters which shall be used for a given connection may also be defined. In other words, a specific set of "rules" on which the communication can be based needs to be defined to enable communication by means of the system.

A communications protocol typically defines messages or message sequences relating to various actions and also default actions if, for example, a requested action cannot be carried out. A protocol typically has also various specified time limits for receiving responses to sent messages. If a response is delayed, the protocol typically does not function properly. There may be need to send a message relating to a certain action repetitiously. In a worst case, the requested action is not carried out at all.

One of the control protocols used in the IMS is the Session Initiation Protocol (SIP). SIP is a protocol specified in the Request for Comments RFC 3261 supplied to the Internet Engineering Task Force (IETF). In connection with the IMS, the session initiation protocol is used, for example, for registering to the S-CSCF and for setting up sessions. It shall be appreciated that the term "session" used in this document refers to any communication a user may have such as to a call, data (e.g. web browsing) or multimedia communication and so on. Regarding the delays in receiving a response to a certain SIP message in connection with the IMS, a registration to a S-CSCF may fail or a requested session may not be established.

For enabling end-to-end SIP connectivity in IMS, a variety of different registries need to be provisioned to contain consistent data, for example, for routing and authentication purposes. Provisioning refers in this context typically to submitting user profile information defining access to services and settings for the service into information stores (registers).

Provisioning is traditionally done through provisioning mediators who provision sets of new or existing customers (subscribers) into a network. In traditional flow-through provisioning, the mediators usually do not care if the subscription is really used in the network. The registers may therefore contain irrelevant information, and provisioning of services, that are not going to be used, may cause unnecessary use of resources.

An alternative approach to traditional provisioning of services is autoprovisioning. Autoprovisioning usually means that registries containing user profile information are provisioned when a service session is being set up for the first time. In other words, autoprovisioning is typically done when a session controller plane does not either recognise end user or profile information is not found in relevant registers.

At least one problem relating to autoprovisioning is that the provisioning mediators do not currently have access to user traffic neither do they handle the session controller logic. Therefore the provisioning mediators cannot participate in figuring out when auto provisioning is actually needed. Session controller plane elements are typically separate from the management plane, and therefore the session control plane elements do not participate in management plane traffic.

It shall be appreciated that although the above discussed problems relate to the IMS, similar disadvantages may be associated with other systems as well and thus the description is not limited to these examples.

SUMMARY OF THE INVENTION

It is an aim of embodiments of the present invention to address one or more of the problems discussed above.

A first aspect of the invention relates to a method for provisioning services in a communications system, said method comprising
- providing to a service provisioning mediator entity information defining a set of service provisioning triggering messages, said set comprising at least one message,
- receiving a service provisioning triggering message in the service provisioning mediator entity from a further network entity involved in providing the service to a user, said service provisioning triggering message comprising information relating to an identifier associated with the user, and
- triggering service provisioning in the communications system for the user by the service provisioning mediator entity in response to receiving said service provisioning triggering message.

A second aspect of the invention relates to a service provisioning mediator entity for a communications system, comprising
- means for storing information defining a set of service provisioning triggering messages, said set comprising at least one message,
- means for detecting receipt of a service provisioning triggering message from a further network entity involved in providing a service to a user, said service provisioning triggering message comprising information relating to an identifier associated with the user, and
- means for triggering service provisioning in the communications system for the user, said means for triggering being responsive to said means for detecting receipt of said service provisioning triggering message.

A third aspect of the invention relates to a communications system comprising at least a service provisioning mediator entity and at least one further network entity involved in providing services to at least one user, said service provisioning mediator entity comprising
- means for storing information defining a set of service provisioning triggering messages, said set comprising at least one message,
- means for detecting receipt of a service provisioning triggering message from one of said at least one second network entity, said service provisioning triggering message comprising information relating to an identifier associated with the user, and
- means for triggering service provisioning in the communications system for the user, said means for triggering being responsive to said means for detecting receipt of said message; and
- each of said at least one further network entity comprising means for sending a service provisioning triggering message.

A fourth aspect of the invention relates to a method for handling registration messages in a controlling network entity, said method comprising
- receiving a registration message comprising an identifier associated with a user,
- sending a request message requesting information indicating a controlling entity for the user from an information store,
- receiving from the information store a response message indicating that the user is unrecognised, and
- sending a service provisioning triggering message relating the user to a further network entity.

A fifth aspect of the invention relates to a device for handling registration messages in a communications system, configured to
- receive a registration message comprising an identifier associated with a user,
- send a request message requesting information indicating a control entity for the user,
- receive a response message indicating that that the user is unrecognized, and
- send a service provisioning triggering message relating the user to a network entity of the communications system.

A sixth aspect of the invention relates to a communications system comprising
- a control entity for handling registration messages,
- an information storage for storing information relating to users, and
- a further network entity, said control entity being configured to
  - receive a registration message comprising an identifier associated with a user,
  - send a request message requesting information indicating a serving control entity for the user to the information storage,
  - receive from the information storage a response message indicating that that the user is unrecognized, and
  - send a service provisioning triggering message relating to the user to said further network entity.

A seventh aspect of the invention relates to a method for directing sessions in a communication system, said method comprising
- storing in an information store for an identifier associated with a user at least trigger information for directing a session of the user to an entity defined by the trigger information, said trigger information defining a network entity configured to handle service provisioning triggering messages,
- receiving in the information store a request for sending trigger information relating to a user indicated in the request, and
- sending the trigger information in response to receiving said request.

An eighth aspect of the invention relates to an information store, configured to store user information for a plurality of users, said user information relating to an identifier associated with a user and comprising at least trigger information, wherein said trigger information relating to at least one user defines that a session is directed to a network entity configured to handle service provisioning triggering messages.

A ninth aspect of the invention relates to a communications system comprising
- a service provisioning mediator entity configured to trigger service provisioning in the communications system in response to receiving a service provisioning triggering message,
- an information store configured to store user information for a plurality of users, said user information relating to an identifier associated with a user and comprising at least trigger information, wherein said trigger information relating to at least one user defines that a session is directed to a network entity configured to handle service provisioning triggering messages; and
- a controlling entity configured to request and receive trigger information relating to a user from the information store, and send a message relating the user to said service provisioning mediator entity, the service provisioning mediator entity handling said message as a service provisioning triggering message.

A tenth aspect of the invention relates to a method for requesting service provisioning in a communications device, comprising
- storing information about a service provisioning mediator entity,
- detecting a need for requesting provisioning of a service, and
- in response to detecting said need, sending a message requesting service provisioning to said service provisioning mediator entity configured to trigger service provisioning in the communications system.

An eleventh aspect of the invention relates to a communications device, configured to
- store information about a service provisioning mediator entity,
- detect a need for requesting a new service, and
- in response to detecting said need, send a message requesting service provisioning to said service provisioning mediator entity configured to trigger service provisioning.

A twelfth aspect of the invention relates to a communications system comprising at least a communications device and a service provisioning mediator entity, said communications device configured to
- store information about the service provisioning mediator entity,
- detect a need for requesting a new service, and
- in response to detecting said need, send a message requesting service provisioning to said network entity configured to trigger service provisioning; and said service provisioning mediator entity configured to trigger service provisioning in response to receipt of a message requesting service provisioning.

A thirteenth aspect of the invention relates to a method for handling establishment of a packet data connection, said method comprising
- receiving a packet data connection establishment request indicating an access point,
- checking whether the indicated access point is a default access point,
- sending a service provisioning triggering message to a further network entity, when the access point is the default access point, and
- establishing a packet data connection to the indicated access point, when the indicated access point is not the default access point.

A fourteenth aspect of the invention relates to a network element for handling establishment of a packet data connection, said network element configured to
- receive a packet data connection establishment request indicating an access point,
- check whether the indicated access point is a default access point,
- send a service provisioning triggering message to a further network entity, when the access point is the default access point, and
- establish a packet data connection to the indicated access point, when the indicated access point is not the default access point.

BRIEF DESCRIPTION OF THE DRAWINGS

Embodiments of the present invention will now be described by way of example only with reference to the accompanying drawings, in which.

DETAILED DESCRIPTION OF EMBODIMENTS OF THE INVENTION

In the following, embodiments of the invention are discussed in detail with reference to the IP Multimedia Subsystem IMS, but it is appreciated that embodiments of the invention may be applicable in other communications system having similar network elements and providing similar functionality as the IMS.

Figure 1:
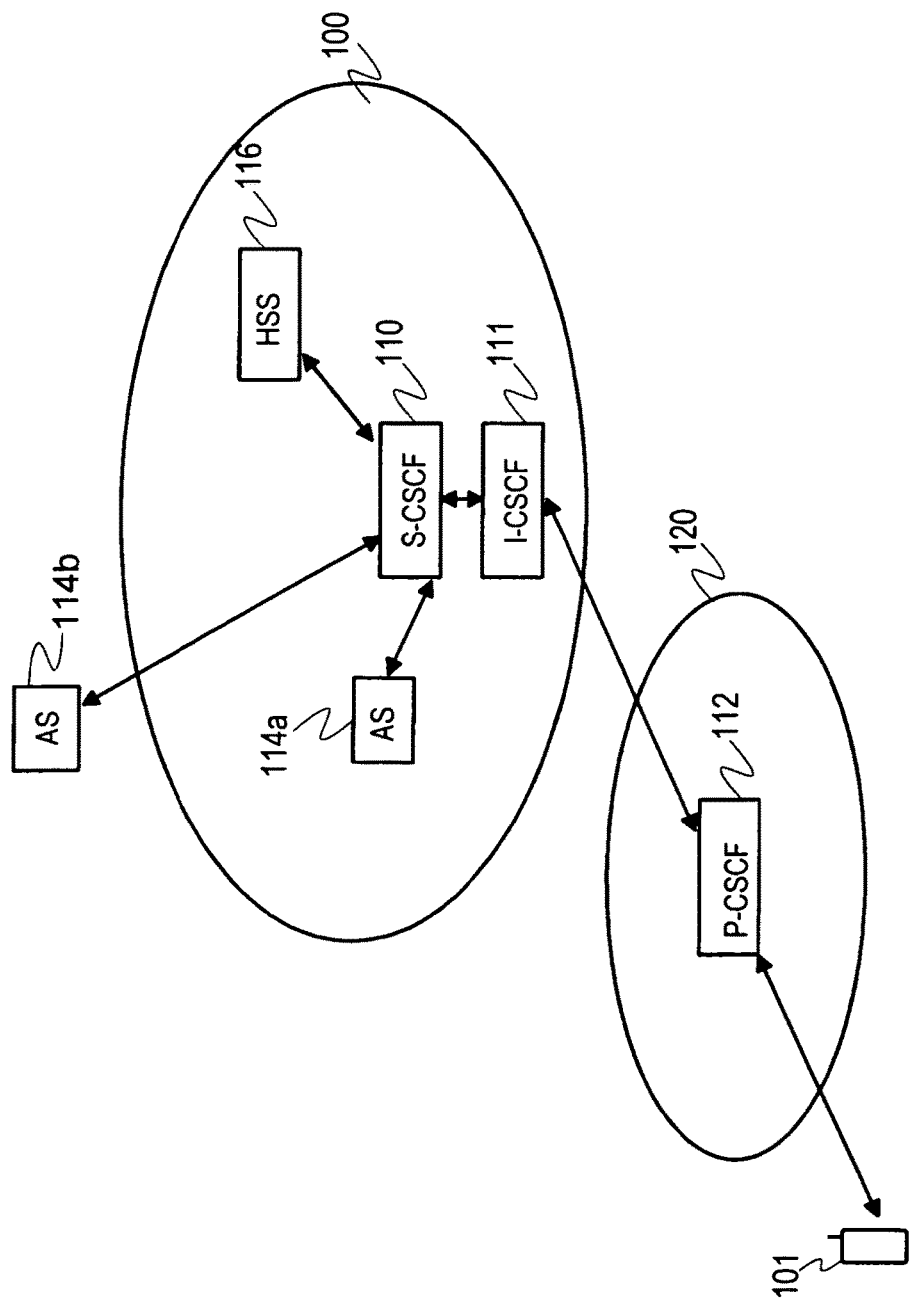
FIG. 1 shows schematically the general architecture of the IP Multimedia Subsystem as an example of a communication system where embodiments of the invention are applicable.

FIG. 1 shows schematically the general architecture of the IP Multimedia Subsystem IMS 100. A user who wishes to use services provided by the IMS may need first to register with a serving controller, such as the serving call session control function (S-CSCF) 110. As shown in FIG. 1, communication between the S-CSCF 110 and the communications device (user equipment UE) 101 may be routed via at least one proxy call session control function (P-CSCF) 112. The P-CSCF 112 is thus for proxying messages to the S-CSCF 110. The communications between the communications device 101 and the P-CSCF 112 are usually provided via an access network 120 or an access entity. The IMS 100 typically contains also an interrogating call session control function (I-CSCF) 111, which may receive all incoming register messages and forward them to the suitable S-CSCF 110. Further network elements may be involved in routing the connection, in addition to the shown P-CSCF, S-CSCF and I-CSCF. The serving controller, i.e. S-CSCF 110 in FIG. 1, in turn, provides the control entity the user equipment 101 needs to be registered with. The registration is required, for example, to enable the communications device to request for a service from an application server (AS) 114a or 114b or to run end-to-end applications with another user equipment. In certain cases, the S-CSCF may find that the total number of registration processes at a certain moment is too much for the capacity of the S-CSCF. In such a case, the S-CSCF may reject a registration request by sending a response forbidding the registration.

A user information store may also be provided for storing information associated with the subscription of the respective user. The user information store may locate in a server of the home network of the subscription. Such subscriber information store may be called by different terms in different communication systems, and in the IMS the subscriber information store is called a Home Subscriber Server (HSS). FIG. 1 shows a home subscriber server (HSS) 116. The HSS 116 can be queried by other function entities over the appropriate reference points, e.g. during session set-up procedures and later. The subscriber information may include information such as data required for authentication purposes (e.g. registration identities of the subscriber or the user equipment, authentication key) and so on. The HSS 116 can also be used for storing permanently subscriber profile information.

The session initiation protocol SIP is used for controlling sessions in the IMS. At least the following entities thus use SIP: the communications device UE, the controlling entity S-CSCF and the proxying entity P-CSCF. The SIP architecture contains, for example, a SIP client, a SIP server, a SIP proxy and a User Agent (UA). A SIP client is any network element that sends SIP requests and receives SIP responses. A SIP server is a network element that receives SIP requests in order to service them and sends back SIP responses to those requests. A SIP proxy is an intermediary entity that acts as both a SIP server and a SIP client for the purpose of making requests on behalf of other SIP clients. A SIP proxy server primarily plays the role of routing. A User Agent is a logical entity that can act as both a user agent client (UAC) and user agent server (UAS). A user agent client is a logical entity that creates a new request, and then uses the client transaction state machinery to send it. The role of UAC lasts only for the duration of that transaction. In other words, if a piece of software initiates a request, it acts as a UAC for the duration of that transaction. If it receives a request later, it assumes the role of a user agent server for the processing of that transaction.

Referring to the IMS, the communications device using the IMS services acts in general as a SIP user agent. The proxy entity P-CSCF acts in general as a SIP proxy, but in some cases also as a SIP User Agent. The controlling entity S-CSCF acts in general as a SIP proxy, but has also some capabilities of a SIP registrar and accepts registering requests. A more detailed description of the capabilities of the communications device (user equipment), S-CSCF and P-CSCF can be found in the 3GPP specification TS 24.229, version 5.6.0, Release 5.

Figure 2:
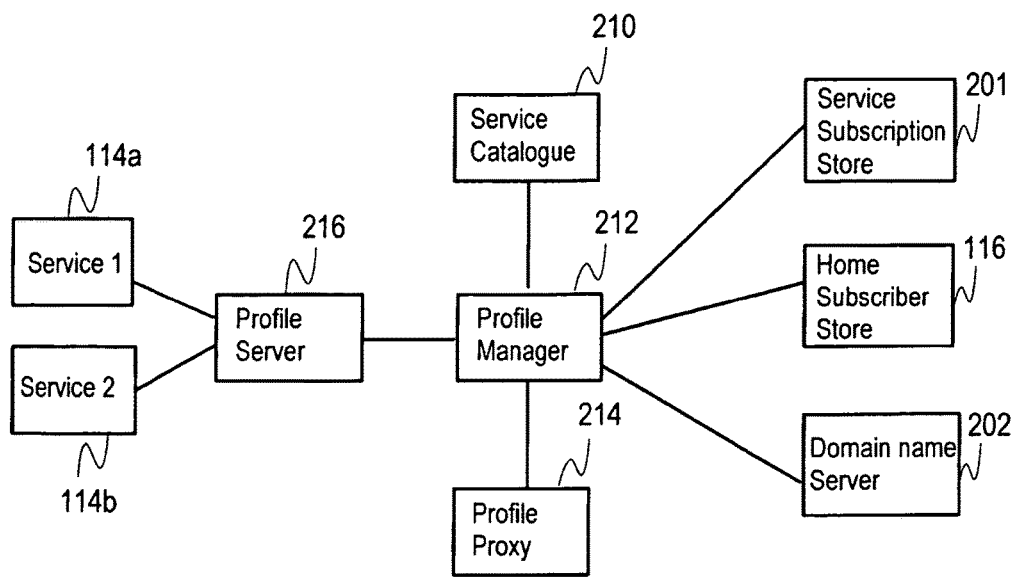
FIG. 2 shows schematically, as an example, some entities and information stores relating to service provisioning and autoprovisioning.

FIG. 2 shows schematically, as an example, some entities and information stores relating to service provisioning and autoprovisioning. A service typically has a specific set of service attributes. Regarding SIP, some examples of service attributes are TELURI publicID, SIPURI publicID, SIPURI user phone, Private Id, Authentication type, Shared secret and Registration Style. Furthermore, there is configuration data relating to a service. When a service is designed, the service attribute set and the configuration data is typically defined. The service attribute set is typically stored in an information store, for example in the Service Subscription Repository 201 shown in FIG. 2. Relevant network elements are provided with the configuration data of the service, for being able to support the service. There may be provided a specific service tool, using which the attribute set and the configuration data can be delivered to the relevant network elements and information stores. The term deployment of a service typically refers to providing relevant configuration information to necessary network elements and, if needed, adding new network element for supporting a service.

In the case of traditional service provisioning, various information stores are updated before the user actually accesses the service to contain information relating to a user making a service subscription. For example, the Home Subscriber Server 116 and the Domain Name Server 202 may be updated by management plane entities to contain information relating to the subscription.

Returning to autoprovisioning, after designing and deploying the service it is possible to create a service package specification for autoprovisioning. This service package specification may be stored in a service package information store, for example in a Service Catalogue 210. For example, for autoprovisioning the IMS service, an IMS service package is created and stored in a service package information store. This service package information store may contain also other service packages relating to services (applications) that can be autoprovisioned. A service management entity, for example a Profile Manager 212, may be provided for managing and monitoring autoprovisioned service subscriptions. An administrative person may, for example, via a specifically designed user interface, have access to the Service Catalogue 210 via the Profile Manager 212.

In the following description, reference is made to a service provisioning mediator entity. A service provisioning mediator entity is not essential for autoprovisioning in a communications system, but it provides a feasible way to handle autoprovisioning requests. In FIG. 2, the service provisioning mediator entity is called a Profile Proxy 214. The features of the service provisioning mediator entity maybe implemented as part of a service management entity, for example, as part of the Profile Manager 212 in FIG. 2.

When a new service has been deployed in the network, the service provisioning mediator entity is typically informed about the new service. This way the service provisioning mediator entity knows which services can be provisioned in the communications system. It is possible that the service provisioning mediator entity is informed about new service, for example, periodically or in response to deploying a new service.

Embodiments of the invention relate to triggering service provisioning in a communications system in response to receiving in the service provisioning mediator entity a service provisioning triggering message from a network element involved in providing a service (that is, sending information forming a part of a service) and/or in providing a communications session to a user. Traditionally, service provisioning has been triggered by management network entities. Some embodiments concentrate on IMS auto provisioning when network does not recognize end user at all, for example because the HSS does not contain subscription information, or subscription is only partly filled and completion of subscription is required. Further embodiments of the invention are applicable also for autoprovisioning any application (server) for a user.

Embodiments of the present invention bridge a gap between session controller and management planes. Earlier, session control and management have been seen as entities separate from each other. Here, a way to route, for example, SIP sessions to the service provisioning mediator entity (the Profile Proxy 214 in FIG. 2) is introduced. The service provisioning mediator entity typically initiates autoprovisioning, for example via the profile manager 212, to all relevant registries and other network elements.

Referring to FIG. 2, the actual service provisioning in a communications system may occur, after the triggering by the Profile Proxy 214, similarly as when services are provisioned by the management plane entities. For example, the Profile Manager 212 may update information in the Service Subscription store 201, a HSS 202 and/or a Domain Name Server 203. The Profile Manager 212 may, typically at least when provisioning an application, contact a Profile Server 216 and the Profile Server 216 in turn updates information in relevant application servers 218a, 218b.

It is appreciated that although FIG. 2 shows a number of network entities relating to service provisioning (the Profile Proxy 214, Profile Manager 212, the Profile Server 216), the functionality relating to these network entities may be supported in a communications system by a different configuration of network entities.

Embodiments of the invention reduce the need of static capacity of, for example, IMS network elements. Embodiments also realize the concept of "active end user" that helps the optimizing the capacity as well as pricing the services provided by the IMS elements. An active end user is an end user that actually uses the IMS network. Embodiments of the invention are compliant with the 3GPP standards of IMS. Furthermore, embodiments of the invention may utilise many existing and new standards, such as OSS/J (Operation Support System through Java initiative), and therefore embodiments of the invention are also applicable for multi-vendor environments.

Figure 3:
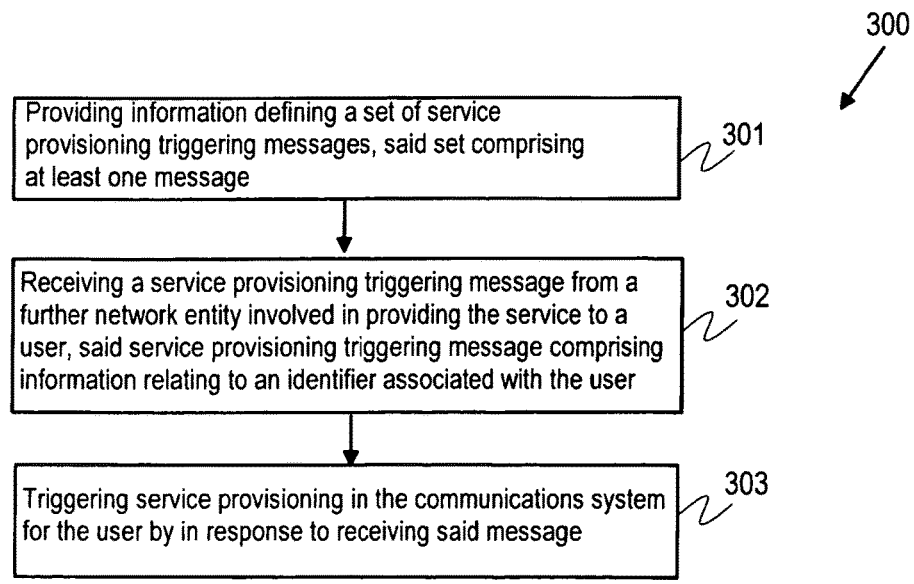
FIG. 3 shows, as an example, a flowchart relating to the operation of a network entity responsible for triggering service provisioning.

FIG. 3 shows, as an example, a flowchart of a method 300 relating to the operation of a service provisioning mediator entity in connection with embodiments of the invention. In step 301, the service provisioning mediator entity is provided with information defining a set of service provisioning triggering messages, said set comprising at least one message. In step 302 the mediator entity receives one of the service provisioning triggering messages, typically from a further network entity involved in providing the service to a user. The received service provisioning triggering message includes information relating to an identifier associated with the user. In step 303, the mediator entity triggers service provisioning in the communications system for the user in response to receiving said service provisioning triggering message. Thereafter service provisioning takes place in the communication system, for example, as discussed above. Possible error situations may need special handling, and in error situations the sender of the service provisioning triggering message (and/or the communications device) may be informed of non-successful service provisioning.

As discussed in more detail below, a first embodiment of the invention relates to provisioning access to the communications system. A second embodiment of the invention relates to provisioning access to services supported by the communications system, for example access to various applications. A third embodiment relates to provisioning access to applications, when a communications device detects need for the service provisioning.

It is therefore appreciated that the service provisioning triggering message may be sent from various network entities. Furthermore, service provisioning triggering messages sent by different network entities may be different. The discussion below will provide some examples. As the Profile Proxy 212, or another similar network entity, may be responsible also for other functionality than triggering service provisioning, there typically is need to define a set of service provisioning triggering messages. This way, the Profile Proxy 212 can easily detect need for service provisioning. The Profile Proxy 212 may determine, which service needs to be provisioned, for example, based on information included in the service provisioning triggering message (e.g. an application to be provisioned is explicitly identified in the service provisioning message) or based on the service provisioning message itself (e.g. a forwarded registration message may indicate request to provision access to the communication system to which the user tried to register).

Figure 4A:
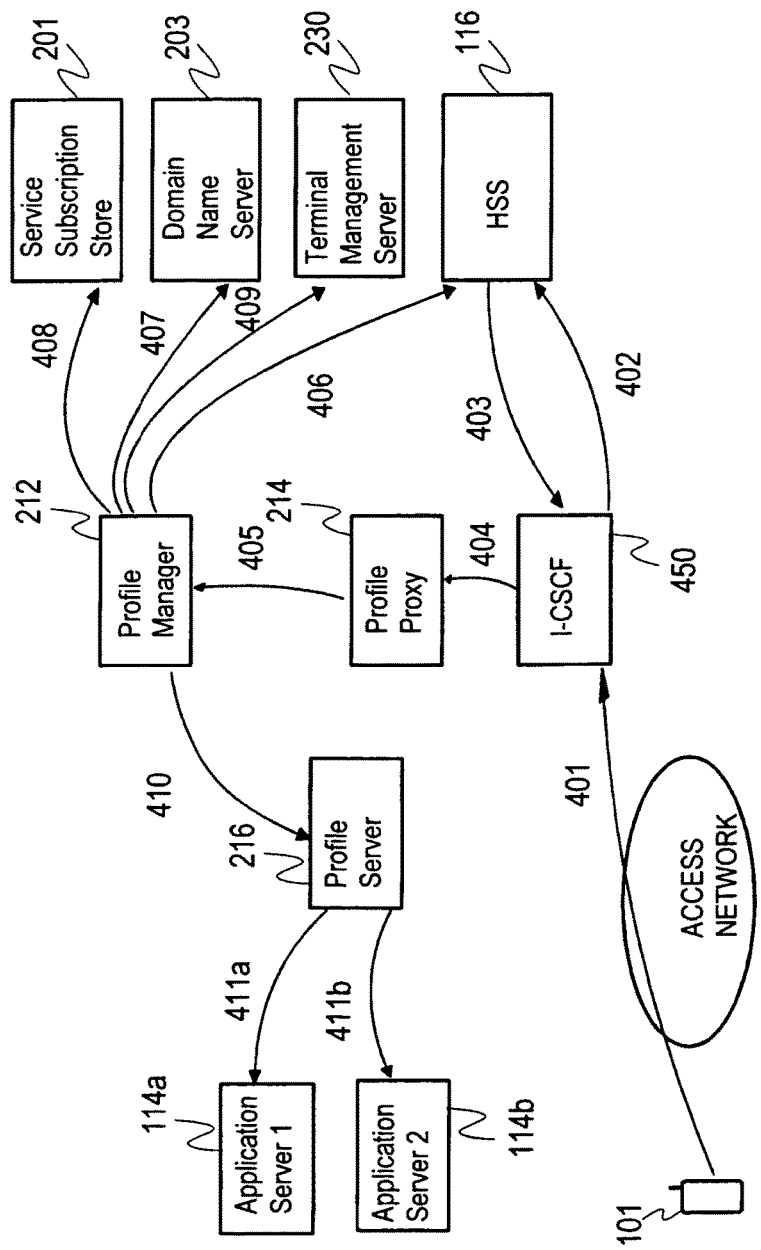
FIG. 4a show, as an example, schematically autoprovisioning of access to a communications system in accordance with a first embodiment of the invention.
Figure 4B:
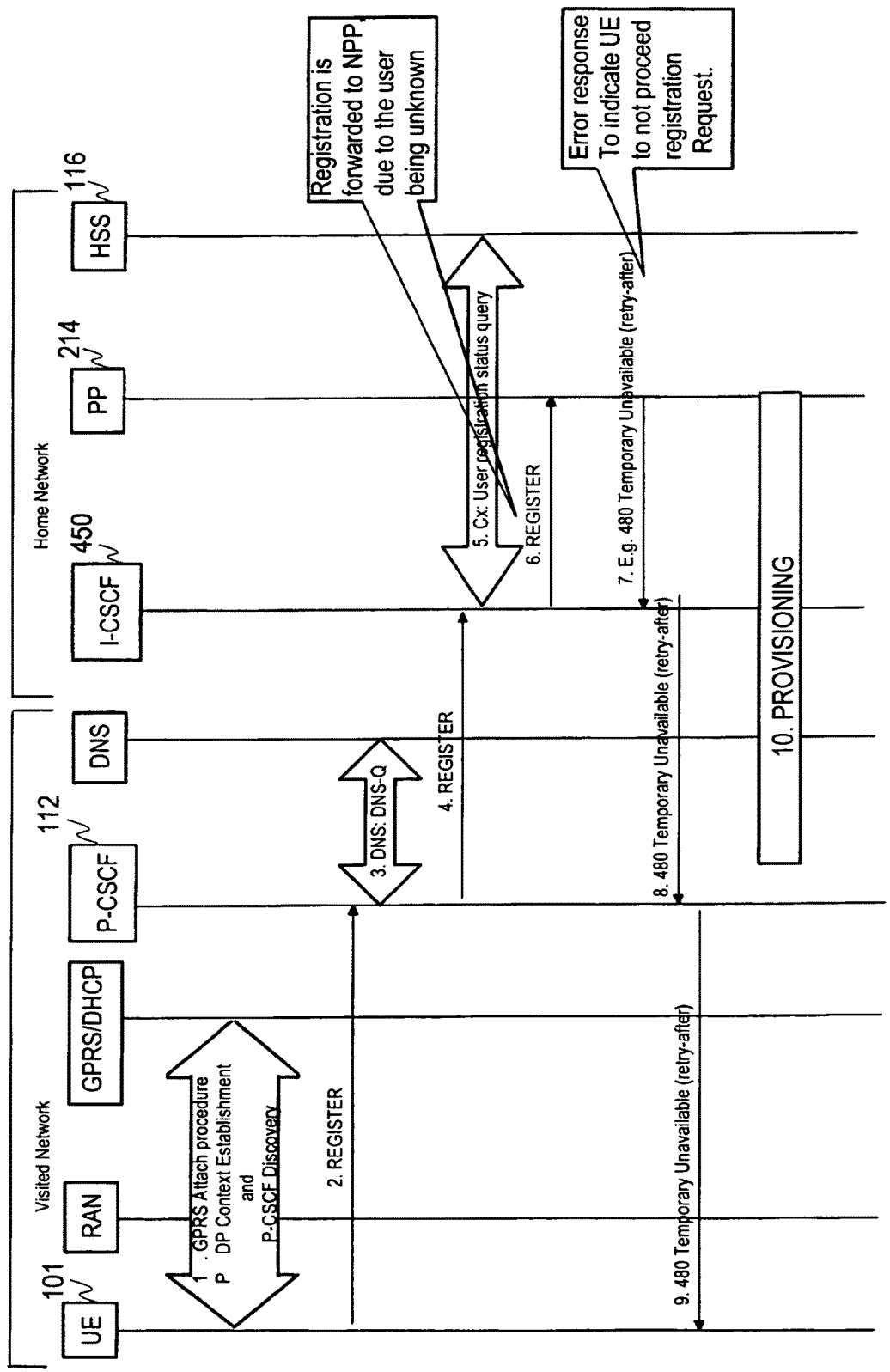
FIG. 4b shows, as an example, a message sequence chart relating to one implementation of the first embodiment of the invention.

FIGS. 4a and 4b relate to autoprovisioning in accordance with a first embodiment of the invention. FIG. 4a shows, as an example, a situation where a user accesses the IMS service for a first time. The IMS service is generally accessed by sending a registration message (a SIP registration). The situation in FIG. 4 typically occurs when the user sends the registration message for the first time. In FIG. 4a, the user (the communications device 101) sends a SIP registration message (indicated with arrow 401), and session routing is done to the relevant control entity 450, which typically is an interrogating control entity (I-CSCF). The registration message contains an identifier associated with the user. In response to receiving the registration message, the control entity 450 sends a request message (arrow 402) to an information store of the communications system, the request message requesting information about a serving control entity (typically S-CSCF) for the user. Typically this request message is sent to a subscriber information store, for example to HSS as shown in FIG. 4a. If, as in the situation discussed here, the subscriber information store contains no information about user, the control entity 450 typically receives a response message (arrow 403) informing the control entity that the user is not recognised by the subscriber information store.

In accordance with the first embodiment, when the control entity 450 determines that the user is unrecognised, the control entity 450—instead of sending an error message to the user or otherwise terminating the session set up—sends a service provisioning triggering message (arrow 404) for the user. Typically this service provisioning triggering message is sent to the Profile Proxy 214, or to other similar service provisioning mediator entity in the communications system. The service provisioning triggering message may be a forwarded registration message or a message containing the registration message. Alternatively, it may be a new message containing at least the identity associated with the user and information indicating that access to the communications system is to be provisioned for the user. In response to receiving the service provisioning triggering message, the Profile Proxy 214 causes the service relating to the received service provisioning triggering message to be provisioned. The Profile Proxy 214 typically informs the control entity that it is temporarily not available. The Profile Proxy 214 may also inform the communications device 101, for example by sending a short message, that service provisioning is in progress. The Profile Proxy 214 may forward the service provisioning triggering message to the Profile Manager 212 (arrow 405). Alternatively, the Profile Proxy 214 may create a further message including at least information identifying the user and sending this further message to the Profile Manager 212. If the Profile Manager 212 and the Profile Proxy 214 are implemented in a single network entity, the message may be replaced by a suitable internal procedure. The Profile Manager 212 provisions the IMS service package to the network by sending proper information to various information stores and network elements. For example, information about the user is sent (arrow 406) to the subscriber information store (HSS 202). If the IMS service of the user involves some new domain names, for example, relevant information may be sent (arrow 407) to a Domain Name Server 203. Information in the Service Subscription Repository 201 may also be updated (arrow 408), for example, by storing a identity information of the user (such as the public identity in IMS) or authentication information relating to the user. Furthermore, if the communications device should be provided with some configuration information or other relevant information, this information can be sent (arrow 409) to the communications device via a terminal management server 230.

Some applications may be provisioned for the user in connection with autoprovisioning access to the communications system (in a specific example, access to the IMS). Provisioning of the applications may be done, for example, by the Profile Manager 212 sending (arrow 510) relevant information about the user to a Profile Server 216. The Profile Server 214 may then forward (arrows 411a, 411b) relevant information about the user to various application servers, or the servers may fetch or read information from the Profile Server 216. FIG. 4a shows two application servers 218a, 218b as examples.

It is appreciated that the service provisioning triggering message (arrow 404), sent by the control entity 450, may be directly sent to the Profile Manager 212. In other words, the Profile Manager 212 may act as the service provisioning mediator entity.

It is appreciated that the very first registration message sent by the communications device 101 may thus cause the communications system to provision access to the communications system for the user associated with the communications device (in other words, indicated in the registration message). When a next registration message is sent from the communications device 101, the user information store 116 contains information relating to the user. The user will be recognised and, after a successful authentication (if authentication is performed at this point), allowed access to the communications system. Authentication is often not performed for a re-registration, but this depends on operator preferences.

FIG. 4b shows, as an example, a message sequence chart relating to one implementation of the first embodiment of the invention. FIG. 4b relates to a specific example of a SIP signalling flow for a user using a communications device (UE in FIG. 4b) including an identity module (typically a smart card, for example a Universal Subscriber Identity Module USIM) and accessing the IMS via GPRS. It is appreciated that for a skilled person it is evident how to carry out similar procedure in other access network than GRPS based on FIG. 4b.

An application in the communications device typically generates necessary parameters for accessing IMS. These parameters may include IMPU-T, IMPI and Home Domain network Name based on information stored in the identity module. Also information relating to IMS access point is generated. The IMPU parameter is an IP Multimedia Public User identity. Public identities are used as addresses in user-to-user communication in IP multimedia subsystem. The IMPI parameter is IP Multimedia Private Identity. Every IP multimedia core network subsystem user has a private user identity. The network operator allocates the private identity to a user and the identity is valid for the duration of the user's subscription.

In the example shown in FIG. 4b, the communications device UE and the GRPS network first perform a GPRS Attach procedure and establish a Packet Data Protocol (PDP) context. The communications device carries out the PDP context activation towards the default APN. A P-CSCF Discovery procedure is carried out between the communications device and the GPRS network, and after this procedure the communications device is able to contact the P-CSCF (in the visited network, if the user is roaming) by sending a SIP REGISTER message. This registration message contains the default autoprovisioning identities. The P-CSCF finds the I-CSCF for the user based on the identity information present in the registration message, for example by making a DNS query to a DNS server. After knowing the I-CSCF, the P-CSCF forwards the registration to the I-CSCF in the home network of the user. The I-CSCF requests information about the S-CSCF relating to the user associated with the identity in the registration message from the HSS. The HSS responds with an error message indicating that the user is unknown, as discussed above in connection with FIG. 4a. Thereafter the I-CSCF forwards the registration message to the Profile Proxy 214 (PP in FIG. 4b) or to another network entity responsible for triggering service provisioning. The PP in FIG. 4b responds with an error message to the I-CSCF, which forwards the error message to the P-CSCF. The P-CSCF, in turn, forwards the error message to the communications device. The error message may indicate, for example, to retry the registration after a given time period. This way the application in the communications terminal may automatically try the registration again after the given time period. The provisioning of access to the IMS is carried out in the communications system in response to the PP receiving the registration message.

Figure 5:
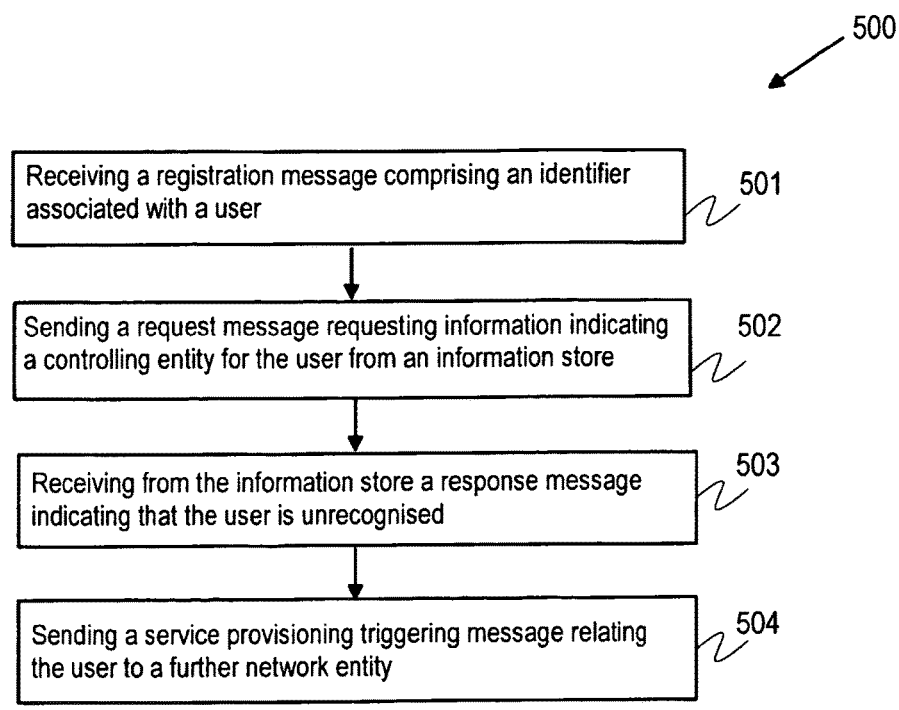
FIG. 5 shows, as an example, a flowchart of a method in accordance with the first embodiment of the invention.

FIG. 5 shows, as an example, a flowchart of a method 500 in accordance with the first embodiment of the invention. The method 500 for handling registration messages is carried out in a control entity 450, typically in an interrogating control entity.

In step 501, a registration message is received in the control entity. The registration message includes an identifier associated with a user. As a specific example, the registration message may be a SIP registration message. In step 502, a request message is sent from the control entity to an information store, in the IMS to a HSS. The request message requests information indicating a controlling entity for the user from an information store. In the IMS, the controlling entity is a S-CSCF and the request message is typically a User Authorization Request (UAR) message. In step 504, the control entity receives from the information store a response message indicating that the user is unrecognised. This message may be, for example, a User Authorization Answer (UAA) message from the HSS. When noticing that the user is not recognised, the control entity sends a service provisioning triggering message relating the user to a further network entity, for example to the Profile Proxy 214. The service provisioning triggering message may be, for example, a forwarded registering message or it may include the original registering message.

Figure 4C:
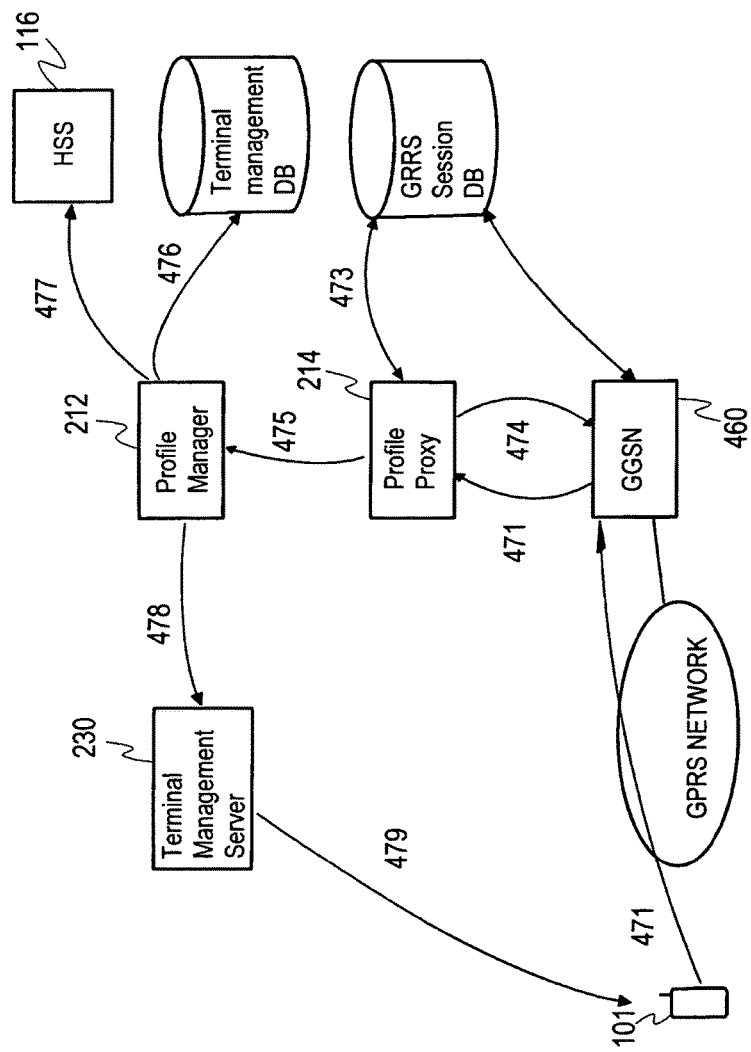
FIG. 4c shows, as an example, an alternative first embodiment, where a service triggering message for provisioning access to IMS is sent from a gateway entity.

FIG. 4c shows, as an example, an alternative first embodiment, where a service triggering message for provisioning access to IMS is sent from a gateway entity 460. Access to the IMS from an access network is provided by the gateway entity connecting the access network to a packet data core network. In FIG. 4c the access network is, by the way of example, a GPRS network and the gateway entity is a Gateway GRPS Supporting Node (GGSN).

In the situation shown in FIG. 4c a communications device 101 has no settings for access to IMS. The user may have accessed IMS earlier, but using another communications device. There may thus exist an IMS subscription for the user. If an IMS subscription exists, suitable settings are sent to the communications device. If an IMS subscription does not exist, the IMS is provisioned for the user. The Profile Manager 212 in FIG. 4c can distinguish between these cases.

As there are no IMS settings stored in the communications device 101, the communications device 101 requests establishment of a packet data connection to a default APN (arrow 471). The request for establishing a packet data connection may be a PDP context activation request. The gateway entity 460 detects the PDP context activation to the default APN, and the gateway entity 460 sends (arrow 472) to the Profile Proxy 214 a service provisioning triggering message, which in this case is an initial registration to IMS with default parameters. The Profile Proxy 214 fetches from a GPRS session database information identifying the user based on the IP address in the initial registration message (arrow 473). The information identifying the user may be, for example, the MSISDN number and/or the IMSI. The gateway entity 460 has stored information about the session in the database. The Profile Proxy 214 also informs the gateway entity 460 that is is temporarily unavailable (arrow 474). The Profile Proxy 214 forwards the service provisioning triggering message together with information identifying the user to the Profile Manager 212 (arrow 475). Alternatively, as discussed above, a new message including relevant information may be sent or the relevant information may be transmitted using a suitable internal procedure.

The Profile Manager 214 provisions the IMS service, if it notices that the user has no IMS service subscription. The Profile Manager 214 may fetch more information from a terminal management database (arrow 476). This fetched information may include user identity information, information about the communications device, information about service subscriptions, and/or information about which services (including IMS) the user may subscribe to. If the Profile Manager 214 decides to provision the IMS service, it updates information in the HSS 116 accordingly (arrow 477). IMS and GPRS parameters may be sent to the communications device 101 by the Terminal Management Server 230 (arrow 479) in response to a request sent by the Profile Manager 214 (arrow 478). The IMS and GPRS parameters may be sent, for example, as a short message in accordance with the Over-the-Air interface.

Figure 6:
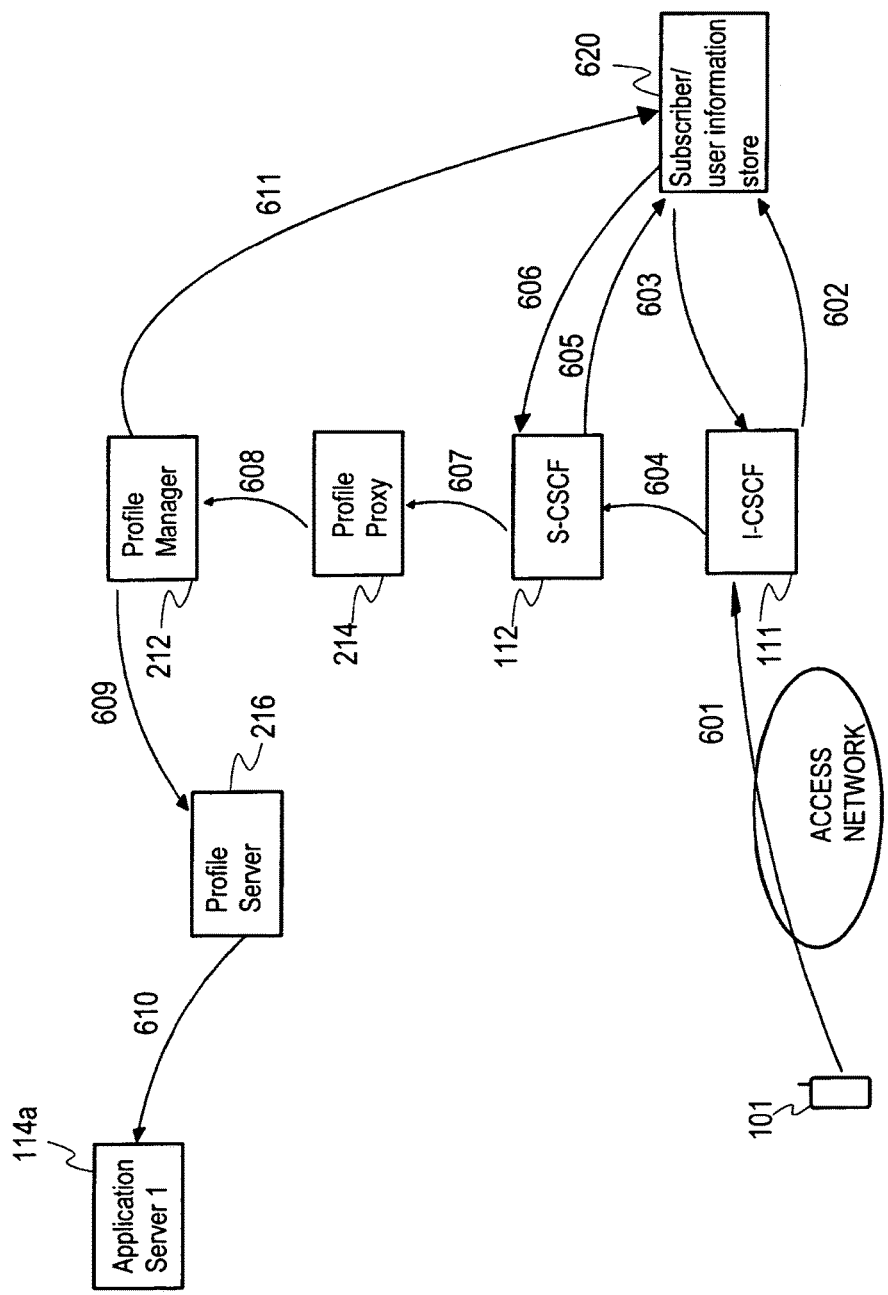
FIG. 6 shows, as an example, schematically autoprovisioning an application in accordance with a second embodiment of the invention.

FIG. 6 relates to autoprovisioning a service in accordance with a second embodiment of the invention. In the second embodiment of the invention, a user information store, for example HSS 620 in FIG. 6, contains basic information about a user of a communications system. This means that when a communications device 101 sends a registration message 601, an interrogating control entity 111 requesting information about a serving control entity 112 (arrow 602) from the user information store 620, the user information store provides information indicating the serving control entity (arrow 603). As specific examples, messages indicated with arrows 602 and 603 may be the UAR and UAA messages mentioned above.

After receiving information indicating the serving control entity 112 for the user, the interrogating control entity 111 routes the session to the serving control entity 112 in a normal manner. The serving control entity 112, in turn, typically requests for authentication information. from the user information store 620 and authenticates the user. Thereafter the serving control entity 112 typically request (arrow 605) trigger information and possibly other user profile information from the user information store 620. The user information store 620 sends the requested information (arrow 606).

The trigger information stored in the user information store earlier on points in this second embodiment to a service provisioning mediator entity handling service provisioning triggering messages. This trigger information may have been stored to the user information store 620, for example, when the access to the communications service has been provisioned in accordance with the first embodiment of the invention or otherwise.

The serving control entity routes the session to the service provisioning mediator entity, as indicated by the trigger information (arrow 607). In FIG. 6, the service provisioning mediator entity is, as an example, the Profile Proxy 214. In the IMS, the session is typically routed using the IMS Service Control (ISC) interface.

The Profile proxy 214 (or other similar network entity) notices the routed session. To provision an application or a set of applications, a service package has been created earlier on. The service package indicates, for example, which application(s) should be provisioned for the user relating to the routed session. As shown in FIG. 6, the Profile Proxy 214 may instruct (arrow 212) the Profile Manager 212 to carry out provisioning of the application(s). The trigger information in the user information store 620 is updated (arrow 611) in connection with service provisioning, typically to point to one of the application servers 218. The Profile Manager 212 may also instruct (arrow 609) a Profile Server 216 to update information at relevant application servers (arrow 610), in FIG. 6 in the application server 218a.

Figure 7A:
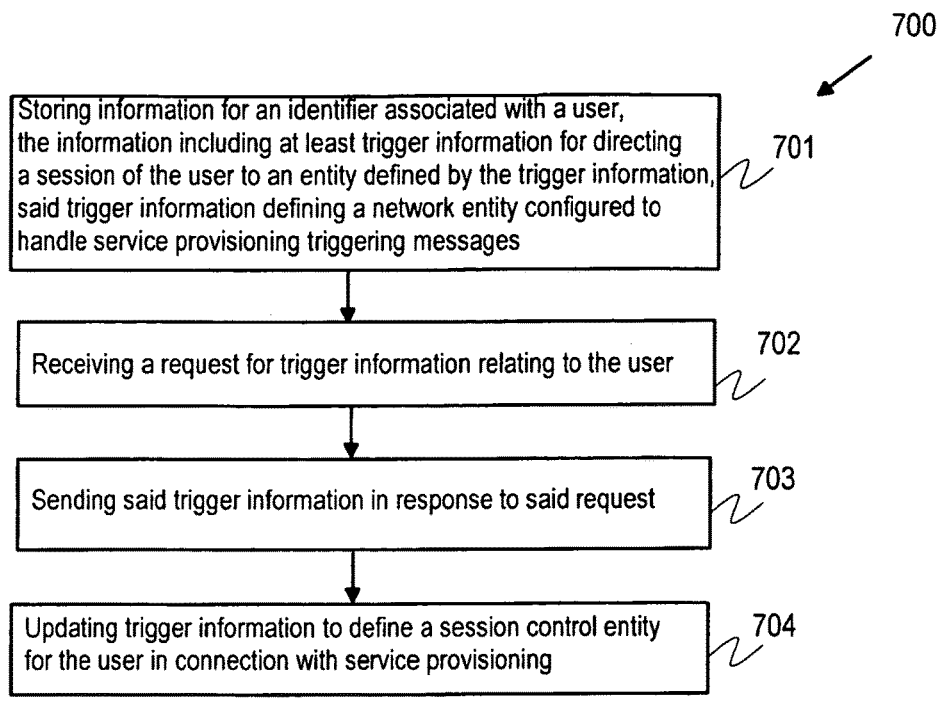
FIG. 7a shows, as an example, a flowchart of a method in accordance with the second embodiment of the invention.
Figure 7B:
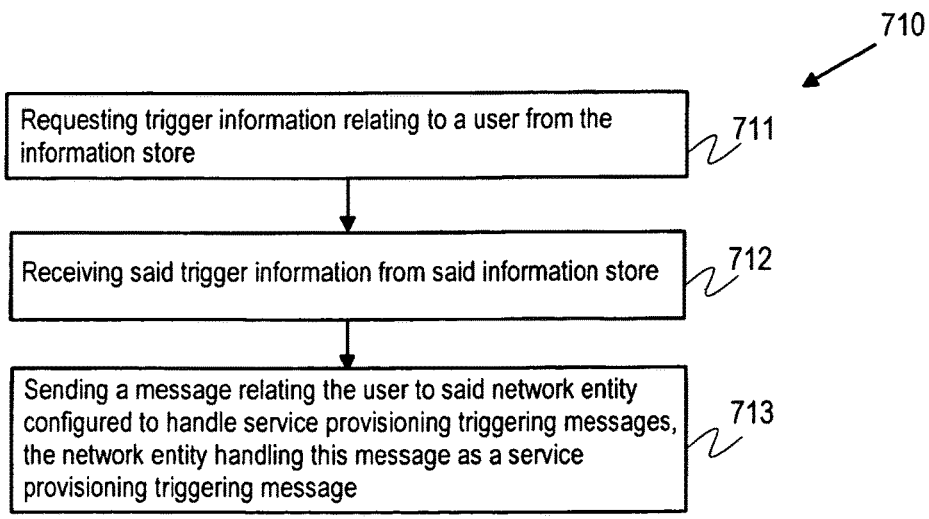
FIG. 7b shows, as an example, a flowchart of a method in accordance with the second embodiment of the invention.

FIGS. 7a and 7b show, as examples, flowcharts of methods 700 and 710 in accordance with the second embodiment of the invention.

The method 700 relates to operation of an information store in a communications system, for example, to a HSS in the IMS. In step 701, information is stored for an identifier associated with a user. This information includes at least trigger information for directing a session of the user to an entity defined by the trigger information. In accordance with the second embodiment, the trigger information defines a service provisioning mediator entity configured to handle service provisioning triggering messages. The information stored in the information store typically contains also information indicating a control entity for the user, for example, a S-CSCF in the IMS.

In step 702, the information store receives a request 605 for sending trigger information relating to a user indicated in the request. In step 703, the trigger information is sent (arrow 606 in FIG. 6). In step 704, the trigger information is updated in connection with service provisioning (for example as discussed in connection with FIG. 2 above) to define a control entity for the user, for example, a S-CSCF in the IMS. After this information update, the trigger information causes a session to be routed to the control entity in a normal manner.

The method 710 relates to the operation of the control entity, for example, to the S-CSCF in the IMS. In step 711, the control entity requests trigger information relating to a user from the information store. In step 712, the control entity receives the trigger information and in step 713 the control entity sends, in accordance with the trigger information, a message relating to the user to a service provisioning mediator entity configured to handle service provisioning triggering messages. The service provisioning mediator entity handles this message sent by the control entity as a service provisioning triggering message. After step 713, the service provisioning in the communications system is triggered and the service is provisioned.

The third embodiment of the invention overcomes, for example, the following problems relating to a situation where a subscriber A wishes to have a SIP based gaming session (or any other application session) with a subscriber B. The subscriber B's communication device may not be provided with the required capability for the gaming session. Furthermore, it may be the case that the subscriber B cannot be charged with the gaming session, as only A has been provisioned into a Gaming Server. Therefore, the gaming session cannot be established between subscribers A and B. The problem here thus relates to provisioning an application to an unknown subscriber B automatically.

In this third embodiment, the communications device of the subscriber B is configured to initiate the required auto-provisioning settings with personalized values fetched from the communications device and typically also from a relating identity module. The auto-provisioning settings may be fetched, for example, via Personal Information Management (PIM) Application Programming Interface (API) by listening the SIP traffic through a standard SIP API.

Triggering of the service auto-provisioning and the initial start of auto-provisioning can be implemented in the communications device very dynamically. Triggering may be based on MIDlet technology, meaning that communications devices are provided with MIDlet application that implement both the SIP API and other standard APIs in order to recognise auto-provisioning needs and send initial auto-provisioning event with personalized values into a service provisioning mediator entity of operator's network.

Figure 8:
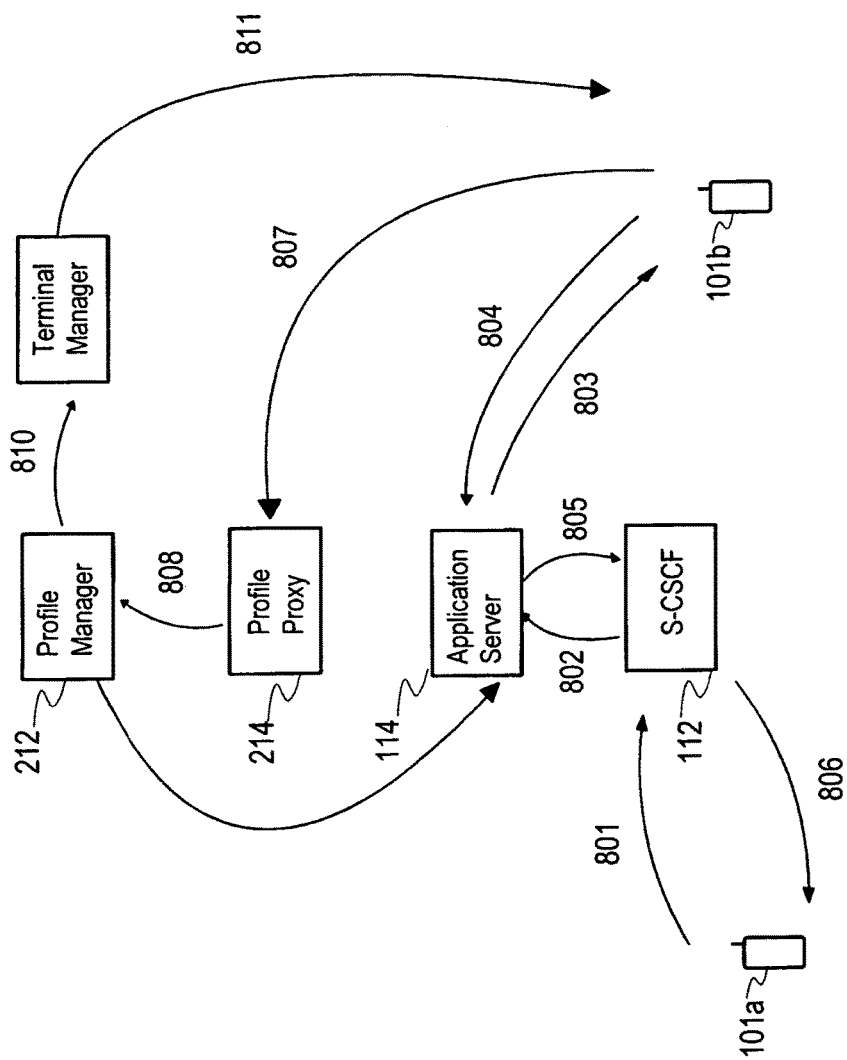
FIG. 8 shows, as an example, schematically autoprovisioning of an application in accordance with a third embodiment of the invention.

FIG. 8 shows, as an example, schematically autoprovisioning of an application in accordance with a third embodiment of the invention. At least the communications device 101b is preprovisioned or preconfigured with, for example, a SIP API MIDlet autoprovisioning application. As an alternative example, to the SIP API MIDlet application, a suitable java application and SIP SDK (software development kit) may be used. The subscriber A (communications device 101a) invites Subscriber B (communications device 101b) for SIP based game (or other application) session. This occurs by the communications device 101 sending a SIP Invite message (arrow 801) to a S-CSCF, the S-CSCF sending a register message to the application server 114 (arrow 802), and the application server sending a SIP Invite message to the subscriber B (arrow 803).

At this point, it is noticed that the relevant (game) application and correct settings are not found in the communications device 101b. Therefore, the session is not accepted by the communications device 101b and it sends a NACK message to the application server 114 (arrow 804). The application server 114 forwards the NACK message to the S-CFCS 112 (arrow 805), which in turn forwards the NACK message to the communications device 101a (arrow 806).

In the communications device 101b, a MIDlet Application (or other suitable application) listens to the SIP stack and in response to a NACK message uses a SIP API to trigger PIM API to get the users personal data from the device. The MIDlet application prompts the subscriber B if she wishes to be provisioned for the (gaming) application and into the (gaming) server 114. The Midlet application may also add an item into to-do list for re-establishing the game session when service provisioning is completed. From the communications device 101b, a contact for a service provisioning mediator entity (Profile Proxy 214 in FIG. 8) is found. This information may have been preconfigured to the communications device 101b.

The MIDlet application resolves the SIPURI from the Invite message that was received, mime-type of the game application, and sends a service provisioning triggering message (arrow 807) to the service provisioning meditor entity. The service provisioning triggering message may be, for example, a SOAP request.

The Profile Proxy 214 sends a provisioning request into the Profile manager 212. The Profile Manager 214 provisions the application server 114 for the subscriber B (arrow 809). The Profile Manager 212 may also provide game (application) settings to the communications device 101b, for example, via a Terminal Management Server 230 (arrows 810, 811). Furthermore, the Profile Manager 212 may inform a Customer Care and Billing (CCB) system about provisioning this application to the subscriber B.

In the communications device 101b, the Midlet application may use the PIM API to prompt the item from the To-Do list and establish a gaming session to Subscriber A via SIP API.

The third embodiment of the invention provides at least the following advantages. It is possible to provision an application for a subscriber B without having basically any information relating to the subscriber B in the network before the subscriber B requests service provisioning. Application sessions can be initiated with any person who does not have required settings and user data provisioned beforehand. No triggers need to be implemented on the network side, and the service provisioning mediator entity provides support for handling the service provisioning triggering message sent by the subscriber B. Charging can be done also for parties that are unknown to the network when invited to the application session. Utilizing the Profile Proxy 214 and the Profile Manager 212, all registries can be provisioned to be in a consistent state and standard notifications can be sent to CCB systems for charging purposes. Furthermore, authentication can be done via the (MIDlet) application in the communications device of the subscriber B.

Figure 9:
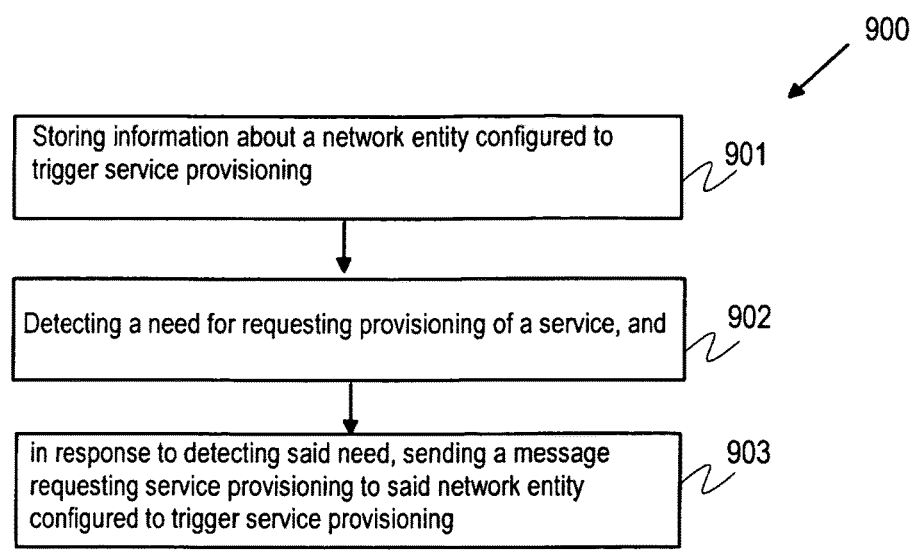
FIG. 9 shows, as an example, a flowchart of a method in accordance with the third embodiment of the invention.

FIG. 9 shows, as an example, a flowchart of a method 900 in accordance with the third embodiment of the invention.

The method 900 is a method for requesting service provisioning in a communications device 101*b*. In step 901, information about a service provisioning mediator entity is stored in the communications device 101*b*. In step 902, a need for requesting provisioning of a service is detected in the communications device 101*b*. As discussed above, this need may be detected by listening to a SIP protocol stack in the communications device and noticing an Invite message and a corresponding NACK message. In step 903, in response to detecting said need, a message requesting service provisioning is sent to the service provisioning mediator entity.

It is appreciated that the first, second and third embodiments of the present may be combined in any suitable manner. For example, access to a communications system may be provided using the first embodiment. Provisioning of, for example, recently deployed applications to a group of users at the initiative of an operator, whenever found necessary, may be carried out using the second embodiment. In addition or alternatively, the third embodiment may be used to provision specific applications when the user tries to access these applications.

It is appreciated that in the above description some features have been discussed in detail with some embodiments of the invention, but it is clear that same details are applicable to other embodiments and combinations of the embodiments, unless clearly in contrast with the above description.

It is also appreciated that the communications device may be any communications device capable of communicating with a communications system and having the necessary functionality for accessing and using services. Examples of communications devices are user equipment, mobile telephones, mobile stations, personal digital assistants, laptop computers and the like. Furthermore, a communications device need not be a device directly used by human users.

A method in accordance with the invention may be implemented as a computer program containing program instructions for causing a computer to perform the method in question. A computer program may be embodied on a computer readable medium or stored in a computer memory.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
   receiving, in a service provisioning mediator entity of a communications system, information defining a set of service provisioning triggering messages, said set comprising at least one message and the service provisioning mediator entity configured to store information of services that can be provisioned in the communication system;
   receiving a service provisioning triggering message from a further network entity involved in providing a service to a user, said service provisioning triggering message comprising information relating to an identifier associated with the user; and
   triggering service provisioning in the communications system for the user by the service provisioning mediator entity in response to receiving said service provisioning triggering message wherein the service provisioning comprises at least one of provisioning access to the communication system, provisioning access to at least one service supported by the communication system and provisioning access to at least one application, the service provisioning mediator entity submitting, as at least a part of the triggered service provisioning, at least one of user profile defining access to services and settings for the service, to at least one information store external to the service provisioning mediator entity, wherein the at least one information store external to the service provision mediator entity comprises at least one of a home subscriber server, a domain name server, or a service subscription repository.

2. A method as defined in claim 1, wherein said receiving of information defining the set of service provisioning triggering messages comprises receiving at least a registration message to the communications system.

3. A method as defined in claim 1, comprising receiving said service provisioning triggering message from a controlling entity of the communications system.

4. A method as defined in claim 1, comprising receiving said service provisioning triggering message from a communications device relating to the user.

5. A method as defined in claim 1, wherein provisioning of access to the communications system is triggered.

6. A method as defined in claim 1, wherein provisioning of an application service within the communications system is triggered.

7. A method as defined in claim 1, comprising provisioning said service in the communications system.

8. A method as defined in claim 1, comprising:
   receiving, in a controlling entity, a registration message comprising an identifier associated with a user;
   sending, from said controlling entity, to an information store a request message requesting information indicating a further controlling entity relating to the user; and
   receiving, in said controlling entity, a response message indicating that the user is unrecognized;
   wherein said service provisioning triggering message is sent from said controlling entity to said service provisioning mediator entity.

9. A method as defined in claim 1, comprising:
   storing, in an information store, at least trigger information for directing a session relating to the user to a network entity defined by the trigger information, said trigger information defining said network entity;
   requesting, in a controlling entity, trigger information relating to the user from the information store; and
   receiving, in said controlling entity, said trigger information from said information store;
   wherein said service provisioning triggering message is sent from said controlling entity to said service provisioning mediator entity in response to detecting, in said controlling entity, that said trigger information defines said service provisioning mediator entity.

10. A method as defined in claim 9, comprising updating, in the information store, said trigger information relating to the user in connection with service provisioning.

11. A method as defined in claim 1, wherein the service provisioning comprises submitting user profile information defining access to services and settings for the service into a plurality of information stores.

12. A method as defined in claim 1, wherein the service provisioning comprises providing a communications device of the user with configuration information.

13. A method, comprising:
receiving, in a controlling network entity, a registration message comprising an identifier associated with a user;
sending a request message requesting information indicating a controlling entity for the user from an information store;
receiving, from the information store, a response message indicating that the user is unrecognized; and
sending a service provisioning triggering message relating to the user to a service provisioning mediator entity configured to store information of services that can be provisioned in a communication system, wherein the service provisioning comprises at least one of provisioning access to the communication system, provisioning access to at least one service supported by the communication system and provisioning access to at least one application, the service provisioning mediator entity submitting, as at least a part of the triggered service provisioning, at least one of user profile defining access to services and settings for the service, to at least one information store external to the service provisioning mediator entity, wherein the at least one information store external to the service provision mediator entity comprises at least one of a home subscriber server, a domain name server, or a service subscription repository.

14. The method as defined in claim 13, wherein the sending the service provisioning triggering message comprises sending the registration message.

15. The method as defined in claim 13, comprising:
receiving said service provisioning triggering message in said further network entity; and
triggering service provisioning in a communications system for the user in response to receiving said service provisioning triggering message in said further network entity.

16. The method as defined in claim 15, comprising provisioning access to said communications system for said user.

17. The method as defined in claim 15, comprising provisioning application service in said communications system for said user.

18. A method, comprising:
storing, in an information store an identifier associated with a user, and at least trigger information for directing a session of the user to an entity defined by the trigger information, said trigger information defining a service provisioning mediator entity external to the information store that is configured to store information of services that can be provisioned in a communication system and to handle service provisioning triggering messages;
receiving, in the information store, a request for sending the trigger information relating to the user indicated in the request; and
sending the trigger information in response to receiving said request to the service provisioning mediator entity for output of service provisioning information, wherein the service provisioning comprises at least one of provisioning access to the communication system, provisioning access to at least one service supported by the communication system and provisioning access to at least one application, and the service provisioning mediator entity submits, as at least a part of the triggered service provisioning, at least one of user profile defining access to services and settings for the service, to at least one information store, wherein the at least one information store external to the service provision mediator entity comprises at least one of a home subscriber server, a domain name server, or a service subscription repository.

19. The method as defined in claim 18, comprising updating said trigger information in said information store in connection with service provisioning after sending the trigger information.

20. The method as defined in claim 18, comprising storing, for the identifier associated with the user, further information indicating a control entity for the user.

21. The method as defined in claim 18, comprising:
requesting, in a controlling entity, the trigger information relating to the user from the information store;
receiving, in said controlling entity, said trigger information from said information store; and
sending a message relating to the user to said network entity configured to handle service provisioning triggering messages, the network entity handling said message as a service provisioning triggering message.

22. The method as defined in claim 21, comprising provisioning a service in the communications system.

23. A method, comprising:
storing information in an apparatus about a service provisioning mediator entity configured to store information of services that can be provisioned in a communication system;
detecting in the apparatus a need for requesting provisioning of a service; and
in response to detecting said need, sending a message from the apparatus requesting service provisioning to said service provisioning mediator entity configured to trigger service provisioning in a communications device wherein the service provisioning comprises at least one of provisioning access to the communication system, provisioning access to at least one service supported by the communication system and provisioning access to at least one application, the service provisioning mediator entity submitting, as at least a part of the triggered service provisioning, at least one of user profile defining access to services and settings for the service, to at least one information store external to the apparatus, wherein the at least one information store external to the service provision mediator entity comprises at least one of a home subscriber server, a domain name server, or a service subscription repository.

24. The method as defined in claim 23, wherein said need for requesting a new service is detected based on refusing an invitation to a service session.

25. The method as defined in claim 24, comprising determining the service to be provisioned based on said refused invitation.

26. The method as defined in claim 23, comprising receiving information relating to settings of the service.

27. The method as defined in claim 23, comprising establishing a service session relating to the service.

28. An apparatus for a service provisioning mediator entity, comprising:
at least one memory configured to store information of services that can be provisioned in a communication system and information defining a set of service provisioning triggering messages, said set comprising at least one message; and
at least one processor configured to cause the apparatus at least to detect receipt of a service provisioning triggering message from a further network entity involved in providing a service to a user, said service provisioning triggering message comprising information relating to an identifier associated with the user, and trigger service provisioning in the communications system for the user, said trigger being responsive to said receipt of said service provisioning triggering message wherein the service provisioning comprises at least one of provisioning access to the communication system, provisioning access to at least one service supported by the communication system and provisioning access to at least one application, a service provisioning mediator entity being configured to submit, as at least a part of the triggered service provisioning, at least one of user profile defining access to services and settings for the service, to at least one information store external to the apparatus, wherein the at least one information store external to the service provision mediator entity comprises at least one of a home subscriber server, a domain name server, or a service subscription repository.

29. An apparatus, comprising:
a receiver configured to receive a registration message comprising an identifier associated with a user in a communications system;
a transmitter configured to send a request message requesting information indicating a control entity for the user;
wherein the receiver is further configured to receive a response message indicating that that the user is unrecognized; and
wherein the transmitter is further configured to send a service provisioning triggering message relating to the user to a service provisioning mediator entity configured to store information of services that can be provisioned in the communication system, wherein the service provisioning comprises at least one of provisioning access to the communication system, provisioning access to at least one service supported by the communication system and provisioning access to at least one application, the service provisioning mediator entity being configured to submit, as at least a part of the triggered service provisioning, at least one of user profile defining access to services and settings for the service, to at least one information store external to the service provisioning mediator entity, wherein the at least one information store external to the service provision mediator entity comprises at least one of a home subscriber server, a domain name server, or a service subscription repository.

30. The apparatus as defined in claim 29, comprising interrogating control entity functionality.

31. An apparatus, comprising:
information store configured to store user information for a plurality of users, said user information relating to an identifier associated with a user and comprising at least trigger information,
wherein said trigger information relating to at least one user defines that a session is directed to a service provisioning mediator entity external to the information store that is configured to store information of services that can be provisioned in a communication system and to handle service provisioning triggering messages wherein the service provisioning comprises at least one of provisioning access to the communication system, provisioning access to at least one service supported by the communication system and provisioning access to at least one application, the service provisioning mediator entity being configured to submit, as at least a part of the triggered service provisioning, at least one of user profile defining access to services and settings for the service, to at least one information store, wherein the at least one information store external to the service provision mediator entity comprises at least one of a home subscriber server, a domain name server, or a service subscription repository.

32. An apparatus, comprising:
at least one memory configured to store information about a service provisioning mediator entity configured to store information of services that can be provisioned in a communication system;
at least one processor configured to cause the apparatus at least to
detect a need for requesting a new service, and
cause a transmitter to, in response to said need being detected, send a message requesting service provisioning to said service provisioning mediator entity configured to trigger service provisioning wherein the service provisioning comprises at least one of provisioning access to the communication system, provisioning access to at least one service supported by the communication system and provisioning access to at least one application, the service provisioning mediator entity being configured to submit, as at least a part of the triggered service provisioning, at least one of user profile defining access to services and settings for the service, to at least one information store external to the apparatus, wherein the at least one information store external to the service provision mediator entity comprises at least one of a home subscriber server, a domain name server, or a service subscription repository.

33. A computer program, embodied on a non-transitory computer readable medium, the computer program configured to control a processor to perform instructions comprising:
receiving, in a service provisioning mediator entity of a communications system, the service provisioning mediator entity being configured to store information of services that can be provisioned in the communication system, information defining a set of service provisioning triggering messages, said set comprising at least one message;
receiving a service provisioning triggering message from a further network entity involved in providing a service to a user, said service provisioning triggering message comprising information relating to an identifier associated with the user; and
triggering service provisioning in the communications system for the user by the service provisioning mediator entity in response to receiving said service provisioning triggering message wherein the service provisioning comprises at least one of provisioning access to the communication system, provisioning access to at least one service supported by the communication system and provisioning access to at least one application, the service provisioning mediator entity submitting, as at least a part of the triggered service provisioning, at least one of user profile defining access to services and settings for the service, to at least one information store external to the service provisioning mediator, wherein the at least one information store external to the service provision mediator entity comprises at least one of a home subscriber server, a domain name server, or a service subscription repository.

34. A computer program, embodied on a non-transitory computer readable medium, the computer program configured to control a processor to perform instructions comprising:

receiving, in a controlling network entity, a registration message comprising an identifier associated with a user;

sending a request message requesting information indicating a controlling entity for the user from an information store;

receiving, from the information store, a response message indicating that the user is unrecognized; and sending a service provisioning triggering message relating to the user to a service provisioning mediator entity configured to store information of services that can be provisioned in a communication system, wherein the service provisioning comprises at least one of provisioning access to the communication system, provisioning access to at least one service supported by the communication system and provisioning access to at least one application, the service provisioning mediator entity submitting, as at least a part of the triggered service provisioning, at least one of user profile defining access to services and settings for the service, to at least one information store external to the service provisioning mediator, wherein the at least one information store external to the service provision mediator entity comprises at least one of a home subscriber server, a domain name server, or a service subscription repository.

35. A computer program, embodied on a non-transitory computer readable medium, the computer program configured to control a processor to perform instructions comprising:

storing, in an information store for an identifier associated with a user, at least trigger information for directing a session of the user to an entity defined by the trigger information, said trigger information defining a service provisioning mediator entity configured to store information of services that can be provisioned in a communication system and to handle service provisioning triggering messages;

receiving, in the information store, a request for sending the trigger information relating to the user indicated in the request; and sending the trigger information in response to receiving said request wherein the service provisioning comprises at least one of provisioning access to the communication system, provisioning access to at least one service supported by the communication system and provisioning access to at least one application, the service provisioning mediator entity submitting, as at least a part of the triggered service provisioning, at least one of user profile defining access to services and settings for the service, to at least one information store external to the service provisioning mediator entity, wherein the at least one information store external to the service provision mediator entity comprises at least one of a home subscriber server, a domain name server, or a service subscription repository.

36. A computer program, embodied on a non-transitory computer readable medium, the computer program configured to control a processor to perform instructions comprising:

storing at an apparatus information about a service provisioning mediator entity configured to store information of services that can be provisioned in a communication system;

detecting at the apparatus a need for requesting provisioning of a service; and in response to detecting said need, sending from the apparatus a message requesting service provisioning to said service provisioning mediator entity configured to trigger service provisioning in the communications device wherein the service provisioning comprises at least one of provisioning access to a communication system, provisioning access to at least one service supported by the communication system and provisioning access to at least one application, the service provisioning mediator entity submitting, as at least a part of the triggered service provisioning, at least one of user profile defining access to services and settings for the service, to at least one information store external to the apparatus, wherein the at least one information store external to the service provision mediator entity comprises at least one of a home subscriber server, a domain name server, or a service subscription repository.

* * * * *